United States Patent
Sato

(10) Patent No.: US 8,096,377 B2
(45) Date of Patent: Jan. 17, 2012

(54) GENERATOR DRIVING DEVICE, HYBRID VEHICLE, AND CONTROL METHOD FOR GENERATOR DRIVING DEVICE

(75) Inventor: Tomohisa Sato, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 339 days.

(21) Appl. No.: 12/449,166

(22) PCT Filed: Feb. 14, 2008

(86) PCT No.: PCT/JP2008/052446
§ 371 (c)(1),
(2), (4) Date: Jul. 27, 2009

(87) PCT Pub. No.: WO2008/099885
PCT Pub. Date: Aug. 21, 2008

(65) Prior Publication Data
US 2009/0308675 A1   Dec. 17, 2009

(30) Foreign Application Priority Data

Feb. 16, 2007   (JP) .................................. 2007-037009

(51) Int. Cl.
*B60W 20/00*   (2006.01)
(52) U.S. Cl. .................... 180/65.275; 180/65.8; 701/22; 320/140; 318/599
(58) Field of Classification Search ............... 180/65.21, 180/65.275, 65.285, 65.31, 65.8; 701/22; 320/140; 318/599, 811, 727
See application file for complete search history.

(56) References Cited

U.S. PATENT DOCUMENTS

| 7,327,113 B2 * | 2/2008 | Steigerwald et al. .......... 318/599 |
| 2004/0178773 A1 * | 9/2004 | Eguchi et al. .................. 320/140 |
| 2006/0103341 A1 | 5/2006 | Steigerwald et al. |
| 2008/0094019 A1 | 4/2008 | Steigerwald et al. |
| 2009/0171521 A1 * | 7/2009 | Moki et al. ....................... 701/22 |

FOREIGN PATENT DOCUMENTS

| JP | 3606760 | 10/2000 |
| JP | 2002-213272 A | 7/2002 |
| JP | 2004-282827 A | 10/2004 |
| JP | 2006-149127 A | 6/2006 |
| JP | 2006-149184 A | 6/2006 |
| JP | 2006-158173 A | 6/2006 |
| JP | 2006-314172 A | 11/2006 |

OTHER PUBLICATIONS

International Search Report dated May 20, 2008, issued on PCT/JP2008/052446.

* cited by examiner

*Primary Examiner* — John Walters
(74) *Attorney, Agent, or Firm* — Edwards Wildman Palmer LLP

(57) ABSTRACT

In order to securely prevent, even where a boosting unit is provided, a rush current from arising when a contactor is turned on during a transient state, the voltage of a surge absorbing condenser is controlled so that the voltage difference between the power source capacitor and surge absorbing condenser falls in a predetermined range. The control is performed in the following manner: of the two voltage source inverters of the AC-coupled bi-directional DC-DC converter composing a voltage converter as a boosting unit, only the one that is not connected in parallel with a power source capacitor is activated to perform a chopping operation while the generator is operated with the contactor off.

6 Claims, 8 Drawing Sheets

US 8,096,377 B2

GENERATOR DRIVING DEVICE, HYBRID VEHICLE, AND CONTROL METHOD FOR GENERATOR DRIVING DEVICE

TECHNICAL FIELD

The present invention relates to a generator driving device that drives an electric motor as a generator, to a hybrid vehicle incorporating a generator driving device, and to a control method for the generator driving device.

BACKGROUND ART

Conventionally, known motor driving devices (see, for example, Patent Document 1) for a hybrid vehicle incorporating an engine and a motor that serve as drive sources include: an inverter for driving the motor; an accumulator battery, such as a large-capacitance capacitor that supplies power to the motor via the inverter and also stores power generated by the motor; a condenser connected in parallel with the accumulator battery; a means for adjusting the generated voltage of the motor; and a contactor connected in series between the accumulator battery and the condenser. In a motor driving device of such a configuration, the motor can be used as a generator while the generated voltage of the motor is adjusted when the engine starts. Accordingly, even if the voltage of the accumulator battery is substantially zero when the engine starts, the accumulator battery will be charged, and the motor can be driven using the charged accumulator battery.

Patent Document 1: Japanese Patent Application Laid-Open No. 2006-314172

DISCLOSURE OF INVENTION

Problem to be Solved by the Invention

In order to boost the voltage of the accumulator battery more efficiently and output this voltage to the motor, the conventional motor driving device described above includes a boosting means such as a voltage converter. However, providing a conventional motor driving device with a boosting means requires a solution to the problem that a large current (rush current) may arise when a contactor is turned on when starting the engine. Therefore, there is great demand for technology that can securely prevent, even where a boosting means is provided, a rush current from arising when a contactor is turned on during a transient state.

The present invention has been proposed in view of the foregoing problem. It is accordingly an object of the present invention to provide a generator driving device capable of securely preventing, even where a boosting means is provided, a rush current from arising when a contactor is turned on during a transient state, and to provide a hybrid vehicle, and a control method for a generator driving device.

Means for Solving Problem

According to an aspect of the present invention, a generator driving device includes: a generator; an engine whose drive shaft is connected to a drive shaft of the generator; a power source capacitor that supplies power to the generator and also stores power generated by the generator; a generator inverter connected to the generator; an AC-coupled bi-directional DC-DC converter that includes two voltage source inverters whose DC terminals are connected to an additive polarity in series, and a transformer that AC-couples AC terminals of the two voltage source inverters and has a specific leak inductance, one of the two voltage source inverters being connected in parallel with the power source capacitor and supplying the inverter with a DC voltage generated by boosting a capacitor voltage of the power source capacitor; a surge absorbing condenser that is connected in parallel with the power source capacitor, has capacitance smaller than that of the power source capacitor, and at least absorbs surge; a contactor connected in series between the power source capacitor and the surge absorbing condenser; and a control unit for performing control such that the contactor is turned on after only the voltage source inverter that is not connected in parallel with the power source capacitor is activated to perform a chopping operation while the generator is operated with the contactor off, in order to control a voltage of the surge absorbing condenser so that a voltage difference between the power source capacitor and surge absorbing condenser falls within a predetermined range.

Advantageously, in the generator driving device, the control unit has a surge absorbing small-capacitance condenser that is connected in parallel with the voltage source inverter that is not connected in parallel with the power source capacitor and connected in series with the surge absorbing condenser, has capacitance smaller than that of the surge absorbing condenser, and at least absorbs surge.

Advantageously, in the generator driving device, the generator is an SR motor. The generator driving device further includes: an excitation power source that is connected to the SR motor via the generator inverter and excites the SR motor; and an SR motor condenser that is connected to the generator inverter and the AC-coupled bi-directional DC-DC converter and charges generation voltage of the SR motor. The control unit turns on the excitation power source if voltage of the SR motor condenser has not reached a predetermined value for a voltage that enables stable control of the generation voltage of the SR motor.

Advantageously, in the generator driving device, each of the voltage source inverter has a plurality of switching elements, and the control unit performs control such that, of the plurality of switching elements of the voltage source inverter, two pairs of switching elements connected in series via the transformer are alternately switched on when only the voltage source inverter that is not connected in parallel with the power source capacitor is activated to perform the chopping operation.

According to another aspect of the present invention, a hybrid vehicle includes the generator driving device described above and uses the generator and the engine as a drive source.

According to still another aspect of the present invention, a control method for a generator driving device, which includes: a generator; an engine whose drive shaft is connected to a drive shaft of the generator; a power source capacitor that supplies power to the generator and also stores power generated by the generator; a generator inverter connected to the generator; an AC-coupled bi-directional DC-DC converter that includes two voltage source inverters whose DC terminals are connected to an additive polarity in series, and a transformer that AC-couples AC terminals of the two voltage source inverters and has a specific leak inductance, one of the two voltage source inverters being connected in parallel with the power source capacitor and supplying the inverter with a DC voltage generated by boosting a capacitor voltage of the power source capacitor; a surge absorbing condenser that is connected in parallel with the power source capacitor, has capacitance smaller than that of the power source capacitor, and at least absorbs surge; and a contactor connected in series between the power source capacitor and the surge absorbing condenser, includes turning on the contactor after only the voltage source inverter that is not connected in parallel with the power source capacitor is activated to perform a chopping operation while the generator is operated with the contactor off, in order to control a voltage of the surge absorbing condenser so that a voltage difference between the power source capacitor and surge absorbing condenser falls within a predetermined range.

EFFECTS OF THE INVENTION

According to the present invention, the voltage of the surge absorbing condenser is controlled so that the voltage difference between the power source capacitor and surge absorbing condenser falls in a predetermined range. This is achieved in the following manner: of the two voltage source inverters of the AC-coupled bi-directional DC-DC converter composing a voltage converter as a boosting means, only the one that is not connected in parallel with the power source capacitor is activated to perform a chopping operation while the generator is operated with the contactor off. This enables stable voltage control even where the voltage of the surge absorbing condenser is low. Accordingly, turning on the contactor after the control process described above makes it possible to securely prevent, even where a boosting means is provided, a rush current from arising when the contactor is turned on.

EXPLANATION OF LETTERS OR NUMERALS

1 GENERATOR DRIVING DEVICE
2 SR MOTOR
3 ENGINE
4 PM MOTOR
5 CAPACITOR (POWER SOURCE CAPACITOR)
6 SR DRIVER (GENERATOR INVERTER)
7 SR CONDENSER (SR MOTOR CONDENSER)
8 VOLTAGE CONVERTER
9 CONTACTOR
10 EXCITATION POWER SOURCE
11 DIODE
12 RELAY
13 PM INVERTER
14 PM CONDENSER
15, 16 CURRENT SENSOR
17, 18, 19, 87, 88 VOLTMETER
20 INSULATION SENSOR
21 CONTROLLER
22 VEHICLE BODY CONTROL UNIT
23 SR MOTOR CONTROL UNIT
24 PM MOTOR CONTROL UNIT
25 VOLTAGE CONVERTER CONTROL UNIT
26 CONTACTOR CONTROL UNIT
81 AC-COUPLED BI-DIRECTIONAL DC-DC CONVERTER
82 LOWER INVERTER
83 UPPER INVERTER
84 TRANSFORMER
84a, 84b COIL
85 CONDENSER (SURGE ABSORBING CONDENSER)
86 CONDENSER (SMALL-CAPACITANCE SURGE ABSORBING CONDENSER)
100 HYDRAULIC SHOVEL
101a SELF-PROPELLING UNIT
101b ROTATING UNIT
821a, 821b, 821c, 821d, 831a, 831b, 831c, 831d IGBT
822a, 822b, 822c, 822d, 832a, 832b, 832c, 832d DIODE
Lv OPERATION LEVER

BEST MODES FOR CARRYING OUT THE INVENTION

The best mode (hereinafter referred to as "an embodiment") according to the present invention will now be described with reference to the accompanying drawings.

Figure 1:
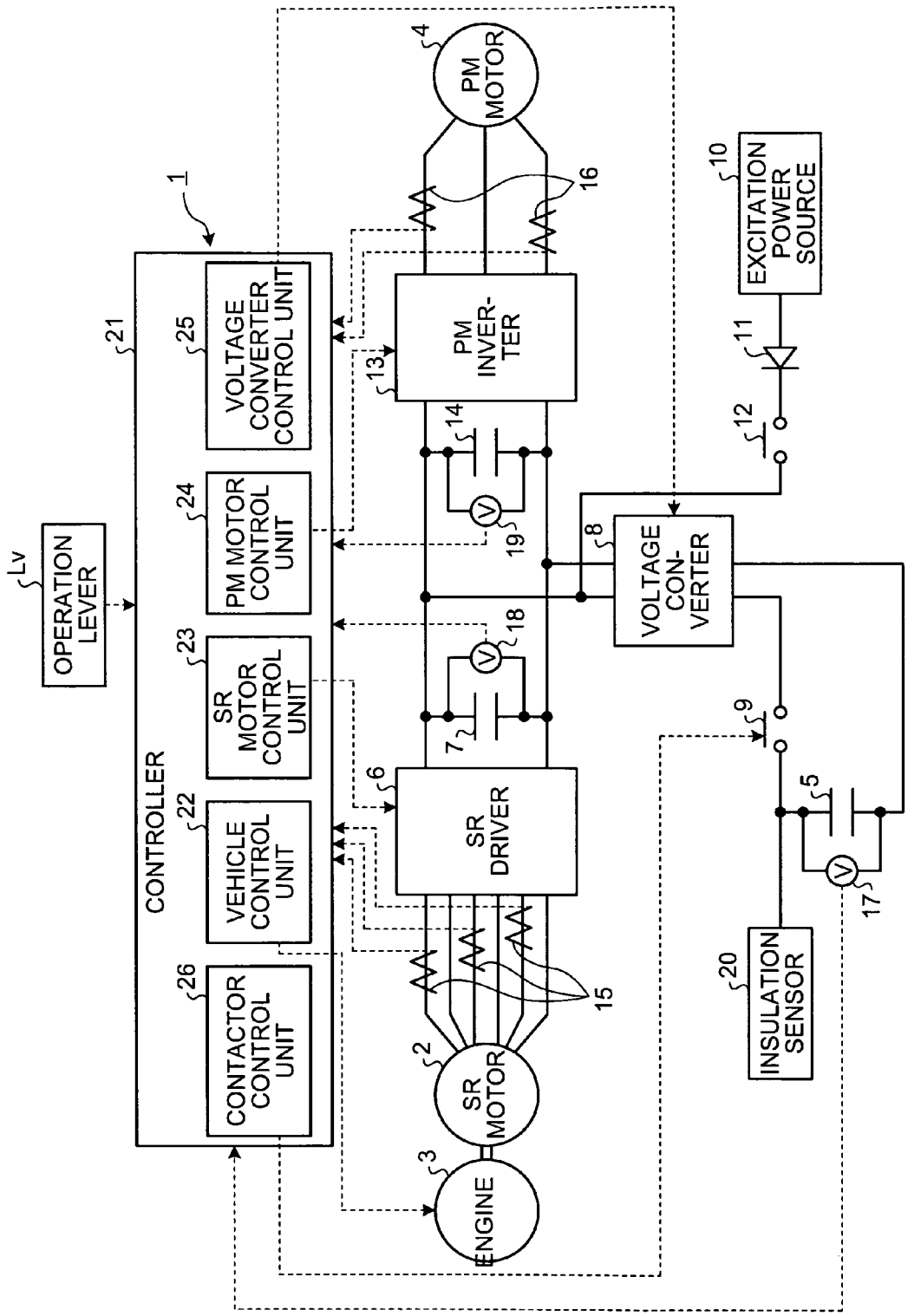
FIG. 1 is a diagram showing a configuration of a generator driving device according to an embodiment of the present invention.
Figure 2:
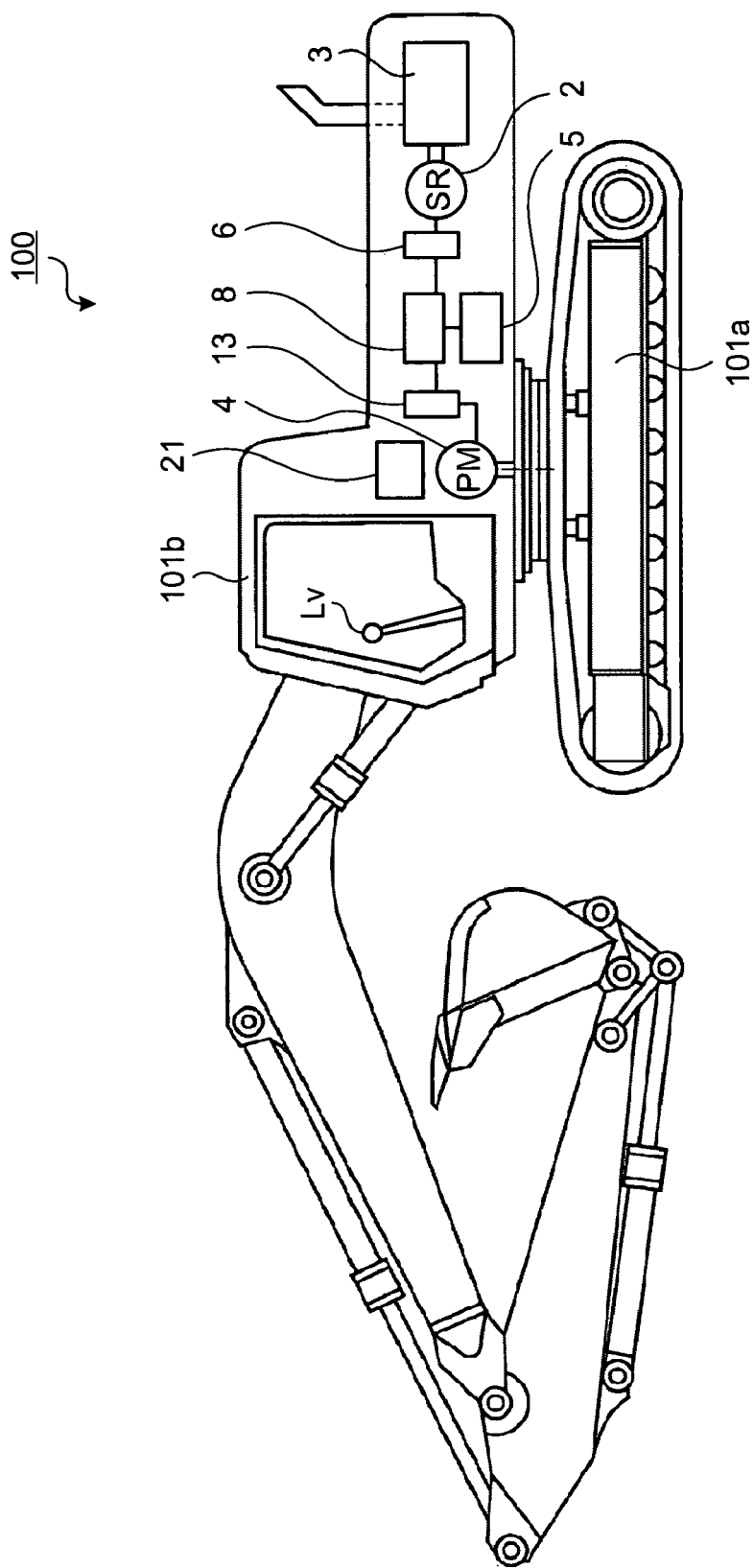
FIG. 2 is a diagram showing a configuration of a hydraulic shovel in which the generator driving device according to an embodiment of the present invention is used.

FIG. 1 is a diagram showing the configuration of a generator driving device according to an embodiment of the present invention. The generator driving device 1 shown in FIG. 1 is incorporated in a hybrid vehicle. In the first embodiment, the hybrid vehicle incorporating the generator driving device 1 is a hydraulic shovel 100 shown in FIG. 2. The hydraulic shovel 100 includes: a self-propelling unit 101a that runs by the rotation of, for example, a crawler track; work machines such as a bucket, boom, and arm; and a driver's cab. The hydraulic shovel 100 also includes a rotating unit 101b that can rotate about a pivot to point a specific direction with respect to the self-propelling unit 101a. The generator driving device 1 incorporated in the hydraulic shovel 100 with such a configuration has: a generator, the drive shaft of which is connected to a drive shaft of an engine; and a rotating motor with a drive shaft coincident with the pivot of the rotating unit 101b.

The detailed configuration of the generator driving device 1 will now be described. The generator driving device 1 has a Switched Reluctance (SR) motor 2 of three-phase excitation type for use as a generator. In this type, a rotor has four poles and a stator has six poles. The drive shaft of the SR motor 2 is connected to the drive shaft of the engine 3. Additionally, the generator driving device 1 has a Permanent Magnetic (PM) motor 4 for use as a rotating motor. The SR motor 2 and PM motor 4 are provided with rotation sensors (not shown) that detect the number of their respective rotations.

The SR motor 2 and PM motor 4 are each supplied with power by a large-capacitance capacitor 5 (a power source capacitor) which includes an electric double-layer capacitor. The capacitor 5 also has the function of accumulating electric power generated by the SR motor 2 and/or PM motor 4.

The SR motor 2 is connected to an SR driver 6, which is a generator inverter. The SR driver 6 is connected in parallel with an SR condenser (an SR motor condenser) that includes a film condenser suitable to shape a waveform and absorb any surge. Connected in parallel with the SR condenser 7 is a voltage converter 8 that boosts and outputs the voltage of the capacitor 5.

Figure 3:
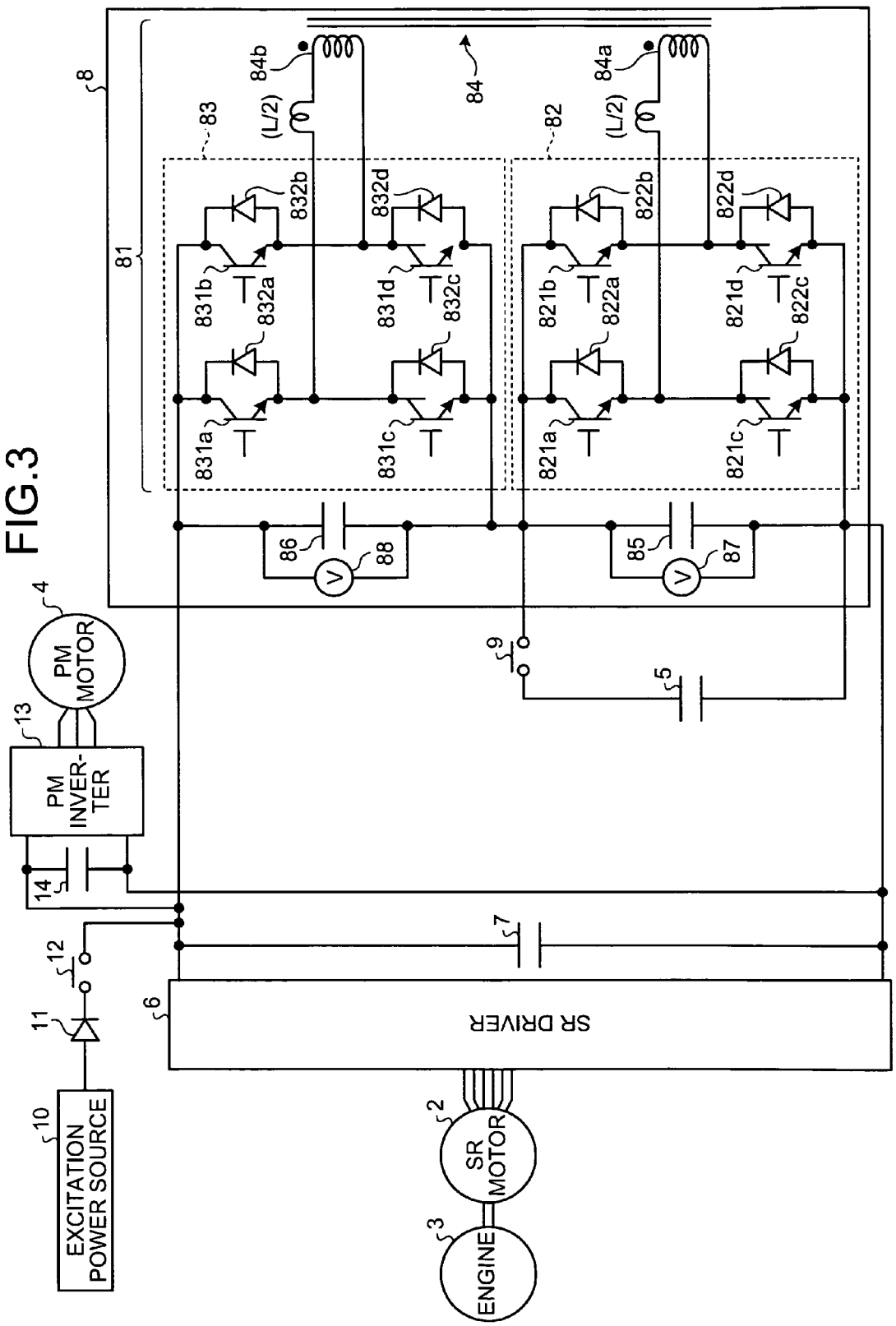
FIG. 3 is a diagram showing a configuration of a voltage converter.

FIG. 3 is a diagram showing the configuration of the voltage converter 8. The voltage converter 8 shown in FIG. 3 is realized by using an additive-polarity AC-coupled bi-directional DC-DC converter 81, in which two voltage source inverters are AC-coupled. AC-coupled bi-directional DC-DC converter 81 has two voltage source inverters, namely a lower inverter 82 and an upper inverter 83, and a transformer 84 that couples the AC sides of the lower and upper inverters 82 and 83.

The lower inverter 82 is configured such that four IGBTs (Insulation Gate Bipolar Transistors) 821a, 821b, 821c, and 821d, serving as power switching elements, are bridge-connected (two on the upper arm and two on the lower arm). Connected in parallel with the IGBTs 821a, 821b, 821c, and 821d are diodes 822a, 822b, 822c, and 822d, respectively, which cause a reflux current to flow when power is switched between them. On the other hand, the upper inverter 83 has four IGBTs 831a, 831b, 831c, and 831d for use as switching elements. Connected in parallel with the IGBTs 831a, 831b, 831c, and 831d are diodes 832a, 832b, 832c, and 832d respectively.

The positive pole DC terminal of the lower inverter 82 and the negative pole DC terminal of the upper inverter 83 are connected to an additive polarity in series. A voltage applied from outside to the AC-coupled bi-directional DC-DC converter 81 is divided between the lower and upper inverters 82 and 83.

A condenser 85 (a surge absorbing condenser) mainly used to absorb any surge is connected in parallel with the lower inverter 82. The capacitance of the condenser 85 is notably small compared to that of the capacitor 5. As with the lower inverter 82, connected in parallel with the upper inverter 83 is a small-capacitance condenser 86 for absorbing any surge (a surge absorbing small-capacitance condenser). It is preferable that the capacitance of the condenser 85 be larger than that of the condenser 86. This is because the amount of surge that may be generated in the condenser 85, which is connected to wiring on the outside of the voltage converter 8, would be larger than the amount of surge generated in the condenser 86. In addition, restricting the capacitance of the condenser 86 has the advantage that the volume of the condenser 86 can be reduced to a minimum, thus saving space.

The lower inverter 82 and upper inverter 83 are connected to a coil 84a of a transformer 84 and a coil 84b of the transformer 84 respectively. Where the lower inverter 82 and upper inverter 83 are rated substantially equally in direct-current voltage, it is preferable that the winding ratio of coil 84a to coil 84b be 1:1. Thus, the winding ratio of coil 84a to coil 84b is 1:1 in the present invention, however, the winding ratio between them may be altered as required.

The transformer 84 has a constant leak inductance (L). In the voltage converter 8, the leak inductance is divided into two equal portions so that the coil 84a side has a leak inductance L/2 and coil 84b side also has L/2. The transformer 84 is configured such that power accumulated temporarily through leak inductance is transferred to the capacitor 5, etc., by the high speed switching control of the lower and upper inverters 82 and 83. Generally it is known that a leak inductance increases with the interval between the primary and secondary coils of a transformer. To avoid this, a transformer is generally formed so that the primary coil and the secondary coil are in close contact with each other. However, in the present embodiment, the interval between the primary and secondary coils, namely the coils 84a and 84b, is purposely adjusted to obtain the required leak inductance. Incidentally, an inductance may be applied to the outside of the transformer 84.

The condenser 85 for a voltage converter 8 having the forgoing configuration is connected in parallel with the capacitor 5. A contactor 9 is connected in series between the capacitor 5 and the condenser 85. By connecting the contactor 9, the voltage converter 8 boosts the voltage (primary side voltage) of the capacitor 5 and supplies the boosted voltage (secondary side voltage) to the SR motor 2 and/or PM motor 4.

The voltage converter 8 is connected in series with an excitation power source 10 that excites the SR motor 2 on the secondary side. The reason for providing the generator driving device 1 with the excitation power source 10 is as follows. Generally, it is characteristic of the SR motor 2 that it produces considerable regenerative energy by the supply of electric energy. Accordingly, driving the inside rotor only is not sufficient to operate the SR motor 2 for use as a generator. In order that the SR motor 2 with such characteristic be operated as a generator, a coil in the SR motor 2 must be excited in advance. However, when the engine 3 starts, the SR condenser 7 has no electric charge. Moreover, even if the contactor 9 is turned on when the engine 3 starts, the SR motor 2 cannot be excited by the capacitor 5. For this reason, the present embodiment uses an excitation power source 10 to excite the SR motor 2 when the engine 3 starts.

A diode 11 and a relay 12 are connected in series between the voltage converter 8 and the excitation power source 10. The diode 11 shuts off the excitation power source 10 when the voltage of the SR condenser 7 becomes higher than that of the excitation power source 10. The relay 12 controls the turning on/off of the excitation power source 10 by an on/off operation.

The PM motor 4 is connected to a PM inverter 13. The PM inverter 13 is connected in parallel with a PM condenser 14 composed of a film condenser. The voltage converter 8 is connected in parallel with the PM condenser 14.

Current sensors 15 are connected in series between the SR motor 2 and SR driver 6. Also, current sensors 16 are connected in series between the PM motor 4 and PM inverter 13.

Voltmeters 17, 18, 19, 87, and 88, which are voltage sensors, are connected in parallel with the capacitor 5, the SR condenser 7, the PM condenser 14, the condenser 85, and the condenser 86, respectively. An insulation sensor 20 is connected to the capacitor 5.

The generator driving device 1 has a controller 21, which is a control means. The controller 21 includes: a vehicle body control unit 22 for controlling the vehicle body of the hydraulic shovel 100; an SR motor control unit 23 for controlling the SR driver 6, thereby controlling the torque of the SR motor 2, the number of its revolutions, or its voltage; a PM motor control unit 24 for controlling the PM inverter 13, thereby controlling the speed of the PM motor 4; a voltage converter control unit 25 for controlling the voltage converter 8; and a contactor control unit 26 for controlling the turning on/off of the contactor 9.

Figure 4:
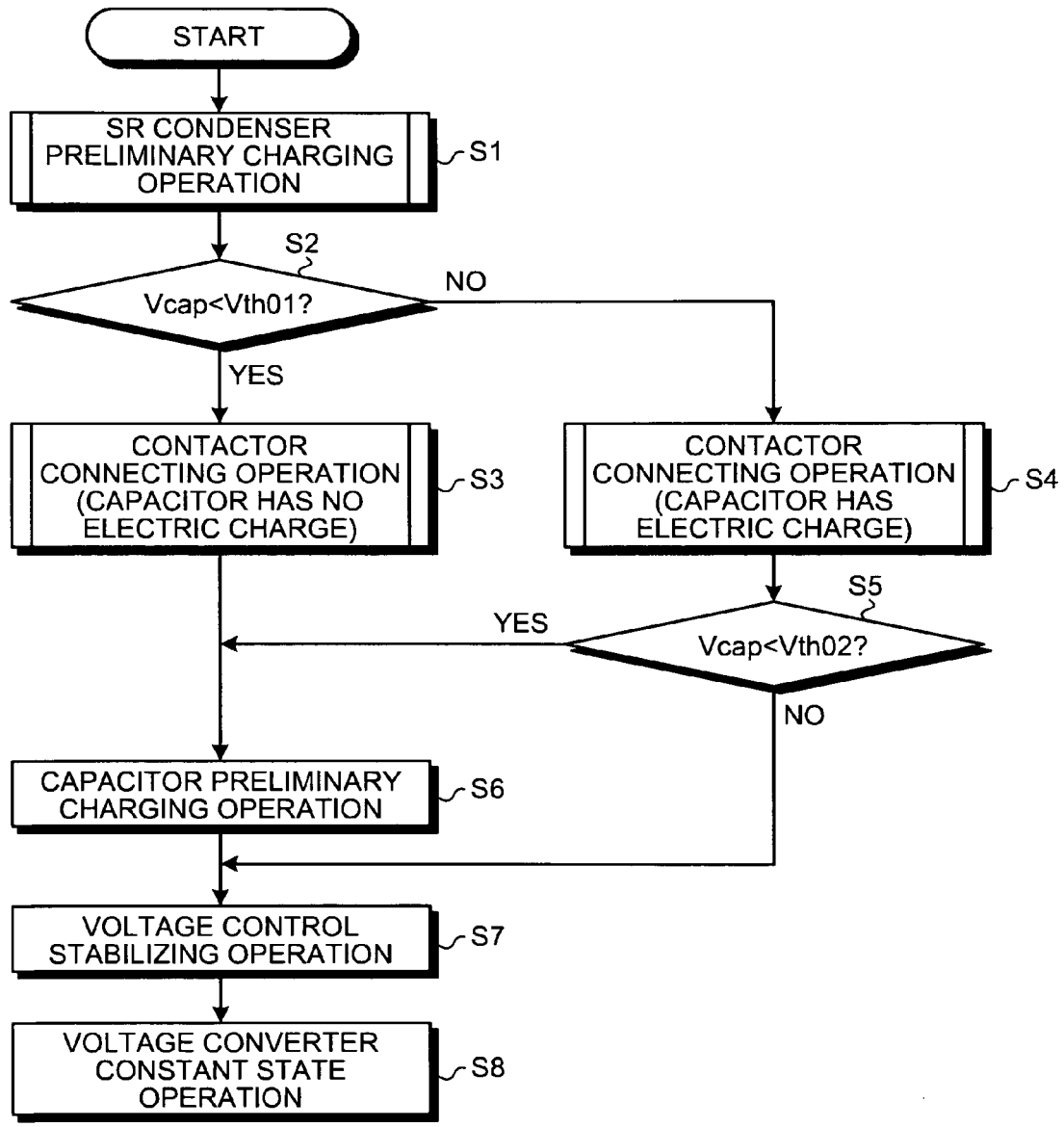
FIG. 4 is a flowchart schematically illustrating the process of a control method for the generator driving device according to an embodiment of the present invention.

FIG. 4 is a flowchart schematically illustrating the process of a control method for the generator driving device according to an embodiment of the present invention. That is, it is a schematic flowchart of a process for the transient state when the generator driving device 1 is started. First, the generator driving device 1 performs a preliminary charging operation of the SR condenser 7 (step S1).

Figure 5:
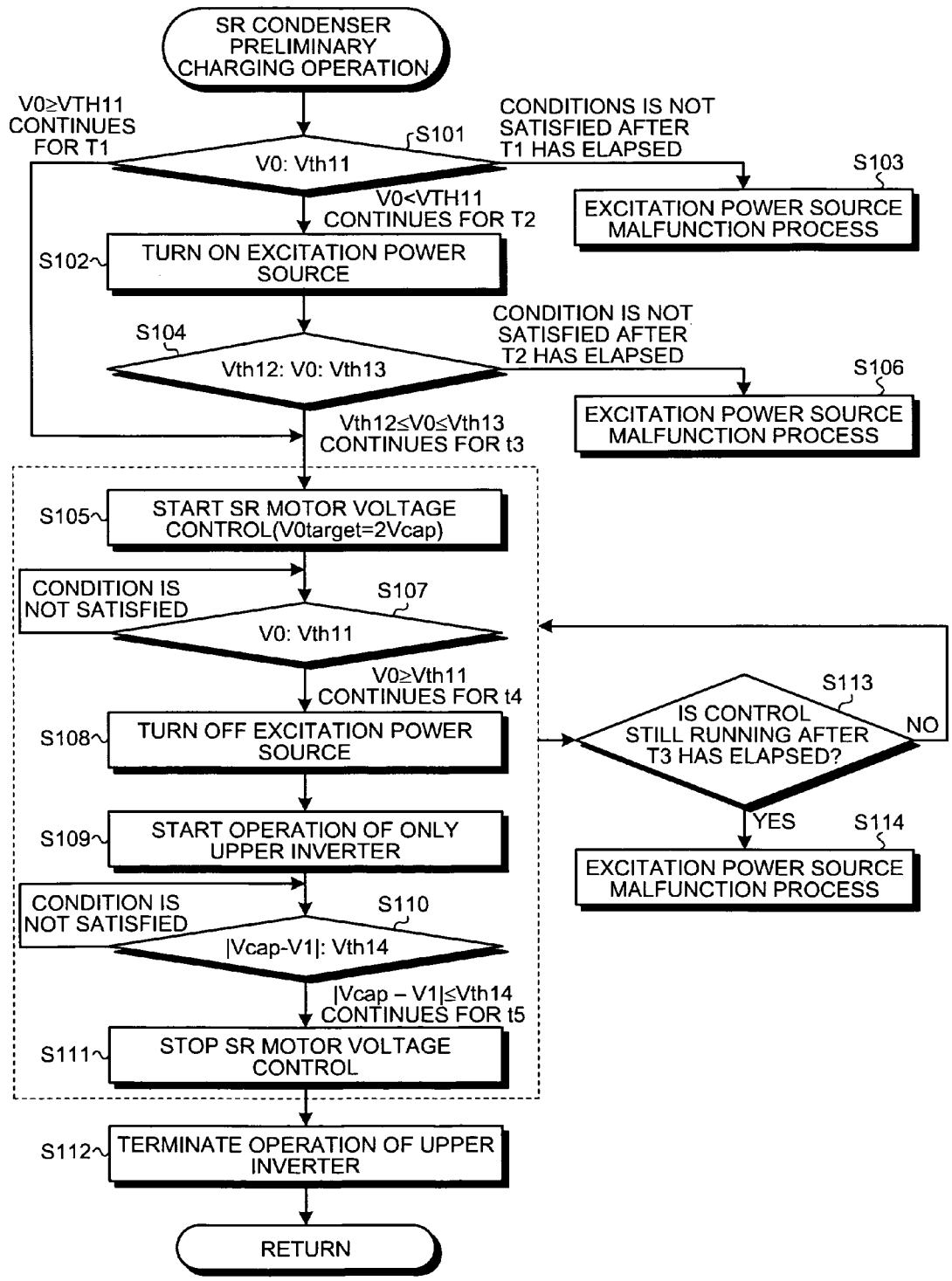
FIG. 5 is a detailed flowchart illustrating the process of the preliminary charging operation of an SR condenser.

FIG. 5 is a detailed flowchart illustrating the process of the preliminary charging operation of the SR condenser 7. In FIG. 5, the generator driving device 1 continuously performs the process of detecting the DC output voltage (=the voltage of the SR condenser 7) V0 of the voltage converter 8 and comparing the detected result with a predetermined threshold value Vth11 (step S101). The threshold value Vth11 is the lowest controllable voltage at which the SR motor 2 is relatively stable. If a DC output voltage V0 satisfies an inequality V0≧Vth11 as the result of the comparison process and the condition satisfying this inequality continues for a predetermined time t1 (step S101, V0≧Vth11 continues for t1), the flow proceeds to step S105. The duration t1 is set as a value that is not affected by voltage detection error (e.g., noise) or control transition. This applies in durations used as determination references for various conditions described below.

On the other hand, if the DC output voltage V0 satisfies the inequality V0<Vth11 and the condition satisfying this inequality continues for a predetermined time t2 (step S101, V0<Vth11 continues for t2), the voltage of the SR condenser 7 is low. Therefore, the relay 12 turns on the excitation power source 10 (step S102), thereby exciting the SR motor 2. The duration t2 may be as long as t1.

If the DC output voltage V0 does not satisfy one of the above-described conditions (i.e., V0≧Vth11 continues for t1 and V0<Vth11 continues for t2) even when a predetermined time T1 has elapsed since the start of the process of step S101 (step S101, the condition is not satisfied even after the elapse of T1), the generator driving device 1 performs a specific process for excitation power source malfunction (step S103). In this case, the time out T1 may substantially be equal to about 100 times of t1. The process for excitation power source malfunction also includes: initializing the generator driving device 1 according to any malfunction of the excitation power source, and informing an operator of the malfunction by displaying an error signal or emitting a warning sound. Various malfunction processes performed later also include a process of matching the content of any malfunction and a process of informing a user of any malfunction.

Next, the case where the generator driving device 1 turns on the excitation power source 10 will be described. The generator driving device 1 compares the DC output voltage V0 of the voltage converter 8 with two predetermined threshold values Vth12 and Vth13 (>Vth12) (step S104). If the DC output voltage V0 satisfies an inequality Vth12≦V0≦Vth13 as the result of a comparison and the condition satisfying this inequality continues for a predetermined time t3 (step S104, Vth12≦V0≦Vth13 continues for t3), the flow proceeds to step S105. The duration t3 substantially equals t1. If the DC output voltage V0 does not satisfy the above-described condition (Vth12≦V0≦Vth13 continues for t3) even when a predetermined time T2 has elapsed since the start of the process of step S104 (step S104, the condition is not satisfied even after the elapse of T2), the generator driving device 1 performs the process for excitation power source malfunction (step S106). The time out T2 used here roughly equals several tens times t3.

Of the threshold values compared with the DC output voltage V0 in step S104, the threshold value Vth12 is the minimum voltage at which the SR motor 2 can securely generate power. Generally, the threshold value Vth12 is smaller than Vth11 (Vth11>Vth12). Additionally, the threshold value Vth13 is the maximum voltage at which the elements of the excitation power source 10 are not damaged during the operation.

Subsequently, the SR motor control unit 23 of the controller 21 controls the SR driver 6, thereby initiating control of power generation voltage of the SR motor 2 (step S105). Hereinafter, this control is called "SR motor voltage control."

Figure 6:
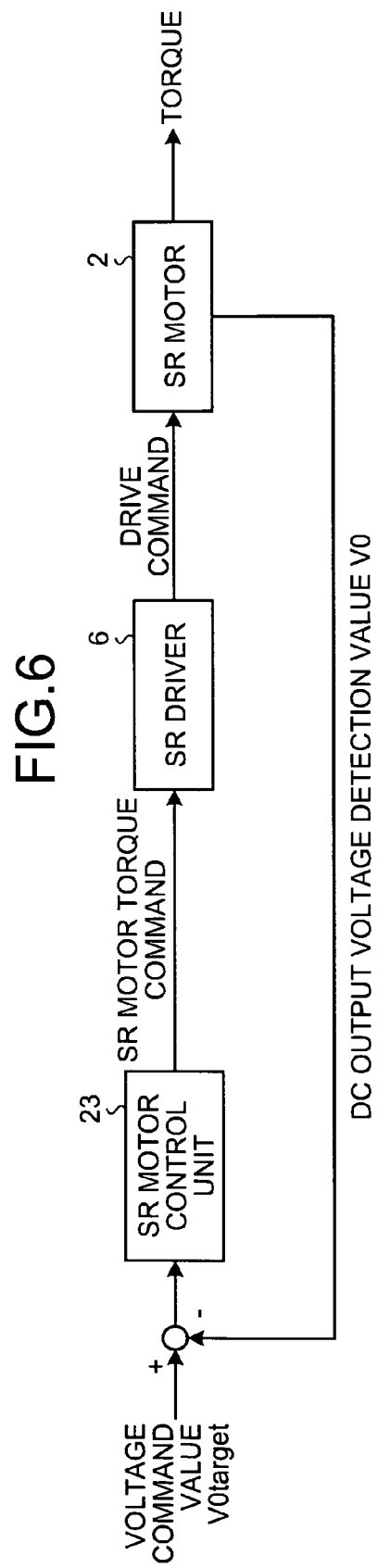
FIG. 6 is a block diagram schematically illustrating the SR motor voltage control.

FIG. 6 is a block diagram schematically illustrating the SR motor voltage control exerted by the SR motor control unit 23. Using a voltage command value (i.e., target voltage) V0 target and a DC voltage detection value V0 acquired by feedback from the SR motor 2, the SR motor control unit 23 performs a PI control, thereby outputting an SR motor torque command to the SR driver 6. The SR driver 6 outputs a drive command to the SR motor 2, thereby generating torque. In the present embodiment, the winding ratio of coil 84a to 84b is 1:1 and, therefore, the voltage command value V0 target is two times greater than capacitor voltage Vcap (2Vcap). Thus, the voltage command value V0 target is determined according to the winding ratio of coil 84a to 84b.

Under the control of the SR driver 6 that has received the SR motor torque command from the SR motor control unit 23, the SR motor 2 performs a regenerative operation in which power is supplied to the capacitor 5 side or a power running operation in which power is supplied from the capacitor 5 side. In the power running operation, a change in the DC output voltage V0 is low. In the regenerative operation, on the other hand, a change in the DC output voltage V0 is high. This is based on the assumption that no load is applied to a DC system line other than the SR motor 2 during the SR motor voltage control. Accordingly, the generator driving device 1 does not drive the PM motor 4 during the SR motor voltage control.

The generator driving device 1 that has started the SR motor voltage control detects a DC output voltage V0, and compares the detected result with the predetermined threshold value Vth11 (step S107). If the DC output voltage V0 satisfies the inequality V0≧Vth11 as the result of the comparison and the condition satisfying this inequality continues for a predetermined time t4 (step S107, V0≧Vth11 continues for t4), the SR motor 2 is capable of performing a power generating operation stably. In this case, the excitation power source 10 is turned off (step S108) and then only the upper inverter 83 of the voltage converter 8 starts a chopping operation under control exerted by the voltage converter control unit 25 (step S109). Specifically, the chopping operation of the upper inverter 83 is actualized by alternately switching a pair of IGBT 831a and 831d and a pair of IGBT 831b and 831c. Consequently, the primary side voltage of the voltage converter 8, that is, the voltage V1 of the condenser 85 becomes V0/2. The duration t4 substantially equals t1.

If the condition (V0≧Vth11 continues for t4) is not satisfied in step S107 (step S107, the condition is not satisfied), the generator driving device 1 continues the comparison between V0 and Vth11.

While the chopping operation of only the upper inverter 83 is ongoing, the generator driving device 1 compares the absolute value |Vcap-V1| of the difference between the voltage Vcap of the capacitor 5 and the voltage V1 (the primary side voltage of the voltage converter 8) of the condenser 85 with a predetermined threshold value Vth14 (step S110). If the absolute value |Vcap-V1| of the difference satisfies the inequality |Vcap-V1|≦Vth14 as the result of the comparison and the condition satisfying this inequality continues for a predetermined time t5 (step S110, |Vcap-V1|≦Vth14 continues for t5), the SR motor control unit 23 stops the SR motor voltage control (step S111). The duration t5 substantially equals t1. The threshold value Vth14 (<Vcap) referred to by the generator driving device 1 in step S110 is set as a value at which the contactor 9 will not fuse when the contactor 9 is connected later. Subsequently, the voltage converter control unit 25 stops the chopping operation of the upper inverter 83 (step S112).

If the condition ($|Vcap-V1| \leq Vth14$ continues for t5) is not satisfied in step S110 (step S110, the condition is not satisfied), the generator driving device 1 continues the comparison between the $|Vcap-V1|$ and Vth14.

If the control does not stop even when a predetermined time T3 has elapsed since the start of the SR motor voltage control (step S113, Yes), the generator driving device 1 performs the process for excitation power source malfunction (step S114). In this case, the time out T3 is substantially 100 times greater than the duration t4 and is substantially equal to T1. If the time T3 has not elapsed since the generator driving device 1 started the SR motor voltage control (step S113, No), the SR motor control unit 23 continues the SR motor voltage control.

In the voltage converter 8, the capacitance of the condenser 85 is smaller than that of the condenser 86, making it difficult for the voltage V1 of the condenser 85 to increase. Accordingly, the voltage V1 of the condenser 85 has to be increased to the required value by operating the AC-coupled bi-directional DC-DC converter 81. However, the process of SR condenser preliminary charging described above may be unstably performed because both the primary and secondary side voltages of the voltage converter 8 are extremely low. As a result, the control itself may become unstable where two voltage source inverters are in operation. The present embodiment overcomes the foregoing drawback by activating only the upper inverter 83, thereby simplifying control. This enables stable control even if the detection value of the primary side voltage of the voltage converter 8 and/or the detection value of the secondary side voltage thereof are extremely low.

Next will be described connecting operations for the contactor 9 (steps S2 and 3), which follow the SR condenser preliminary charging process in step S1 in the control method (shown in FIG. 4) for the generator driving device 1. If the voltage Vcap of the capacitor 5 is lower than Vth01 where the lowest voltage at which the SR motor 2 can securely generate power is Vth01 (=Vth12) (step S2, Yes), it may be assumed that there is almost no electric charge in the capacitor 5. If the voltage Vcap of the capacitor 5 is Vth01 or above (step S2, No), it is assumed that an electric charge is stored in the capacitor 5. The generator driving device 1, therefore, performs the connecting operation for the connector 9 according to whether an electric charge is stored in the capacitor 5 or not.

Figure 7:
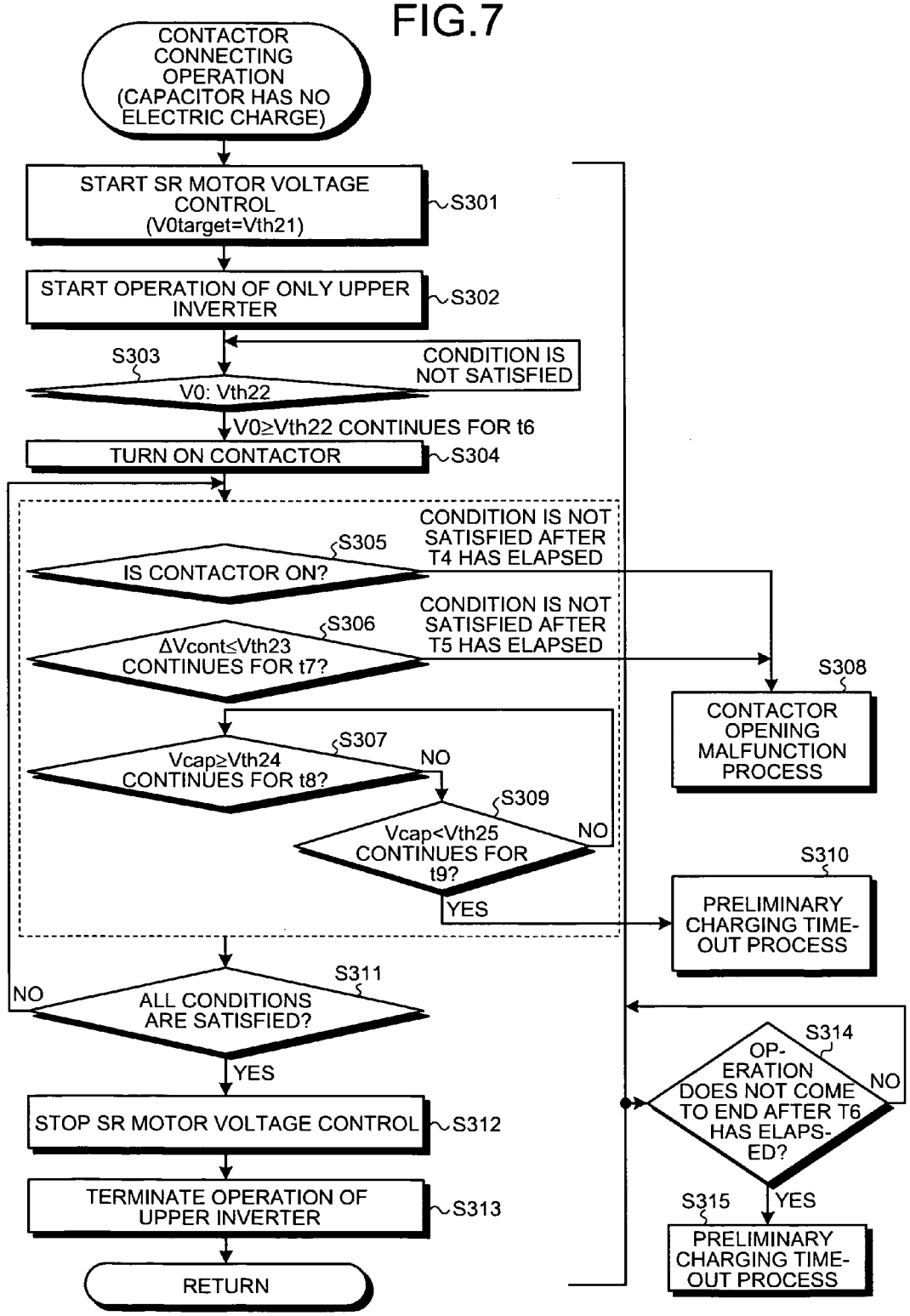
FIG. 7 is a flowchart illustrating the contactor connecting operation where a power source capacitor has no electric charge.

First, the contactor connecting operation where the capacitor 5 has no electric charge (step S3) will be described with reference to the flowchart shown in FIG. 7. In FIG. 7, the SR motor control unit 23 starts SR motor voltage control (step S301). In this SR motor voltage control, the voltage command value V0 target is set to a value (=Vth21) that is two or more times greater than a voltage that would enable transition to the charging process for the capacitor 5. The detailed procedure of the SR motor voltage control is identical to that explained in the SR condenser preliminary charging process (see FIG. 6).

Subsequently, under control performed by the voltage converter control unit 25, only the upper inverter 83 starts a chopping operation (step S302), and the pair of IGBT 831a and 831d and the pair of IGBT 831b and 831c are alternately switched on. In the course of the chopping operation, the generator driving device 1 compares the DC current detection value V0 and a predetermined threshold value Vth22. If the DC voltage detection value V0 satisfies the inequality $V0 \geq Vth22$ as the result of the comparison, and the condition satisfying that this inequality continues for a predetermined time t6 (step S303, $V0 \geq Vth22$ continues for t6), the contactor control unit 26 outputs a control signal for turning on the contactor 9 (ON signal), thereby turning on the contactor 9 (step S304). In this case, taking into account of a voltage change that may occur during the control, the threshold value Vth 22 is set lower than the voltage command value Vth21 (Vth22<Vth21). The duration t6 substantially equals t1.

Subsequently, the generator driving device 1 determines whether the three conditions described below are satisfied or not (steps S305 to S307).

As the first condition, using a specific detecting means, the generator driving device 1 ascertains whether the contactor 9 is on or not (step S305). If the contactor 9 is not turned on even when a predetermined time T4 has elapsed since the generator driving device 1 started the determination (step S305, the condition is not satisfied even after the elapse of T4), the generator driving device 1 performs a contactor opening malfunction process (step S308). The time out T4 here roughly equals 100 times t6.

As the second condition, the generator driving device 1 compares the potential difference ΔVcont between both ends of the contactor 9 with a predetermined threshold value Vth23, and determines whether the ΔVcont satisfies an inequality $\Delta Vcont \leq Vth23$ and whether the condition satisfying this inequality continues for a predetermined time t7 or not (step S306). In this case, taking voltage detection accuracy into account, the threshold value Vth23 is set to a value at which clearly distinguishable voltages can be obtained. The duration t7 roughly equals 10 times t6. If ΔVcont does not satisfy the condition "$\Delta Vcont \leq Vth23$ continues for t7" even when a predetermined time T5 has elapsed since the dymano driving device 1 started the determination (step S306, the condition is not satisfied even after the elapse of T5), the generator driving device 1 performs the contactor opening malfunction process (step S308). The time out T5 is substantially equal to T4.

As the third condition, the generator driving device 1 compares a capacitor voltage Vcap and a voltage Vth24 that enables transition to the charging process for the capacitor 5, and determines whether the Vcap satisfies an inequality $Vcap \geq Vth24$ and whether the condition satisfying this inequality continues for a predetermined time t8 or not (step S307). The threshold value Vth24 is a value set as a voltage that enables transition to the charging operation for the capacitor 5. The threshold value Vth24 is, therefore, not more than ½ of the voltage command value Vth21 in the SR motor voltage control. The duration time t8 roughly equals t7.

If the voltage Vcap does not satisfy the condition "$Vcap \geq Vth24$ continues for t8" as a result of the determination in step S307 (step S307, No), the generator driving device 1 determines whether the voltage Vcap of the capacitor 5 is lower than a predetermined voltage Vth25 (Vcap<Vth25) and whether the condition satisfying the inequality continues for a predetermined time t9 or not (step S309). The threshold value Vth25 used here is a value from which a determination can be made that there has been little increase in the voltage Vcap. If the condition satisfying the inequality Vcap<Vth25 continues for time t9 as a result of the determination in step S309 (step S309, Yes), the generator driving device 1 determines that the capacitor 5 has been short circuited. Then, the device 1 performs a preliminary charging time-out process due to the short-circuit malfunction of the capacitor 5 (step S310). On the other hand, if the voltage Vcap does not satisfy the condition "Vcap<Vth25 continues for t9" (step S309, No), the flow returns to step S307. The duration t9 roughly equals several hundred times t8.

If the first to third conditions described above are all satisfied (step S311, Yes), the generator driving device 1 stops the SR motor voltage control under control performed by the SR motor control unit 23 (step S312), and then terminates the operation of the upper inverter 83 (step S313), thus terminating the series of contactor connecting operations. On the other hand, if any of the first to third conditions is not satisfied (step S311, No), the generator driving device 1 remains in a stand-by mode until the condition is satisfied.

If the contactor connecting operation (i.e., the capacitor has no electric charge) described above does not come to an end even when a predetermined time T6 has elapsed (step S314, Yes), the generator driving device 1 performs a preliminary charging time-out process (step S315). The time out T6 roughly equals several tens times the time out T4 and T5 described above. If the time T6 has not elapsed since the generator driving device 1 started the SR motor voltage control (step S314, No), the generator driving device 1 continues the contactor connecting operation.

In the contactor connecting operations (in the case where the capacitor has no electric charge) described above, the contactor 9 is connected while the SR motor 2 and only the upper inverter 83 of the voltage converter 8 are in operation. Accordingly, although the DC output voltage V0 drops for a moment during contactor connection, the problem caused where the operations of the SR motor 2 and voltage converter 8 start simultaneously after the connection of the contactor 9 is eliminated. That is, electric charge stored in the SR condenser 7 is prevented from flowing into the capacitor 5 rapidly, which would result in a voltage drop to such a level that the SR motor 2 cannot generate power. This enables the capacitor 5, the voltage of which is almost 0(V), to be continuously charged by the SR motor 2.

Figure 8:
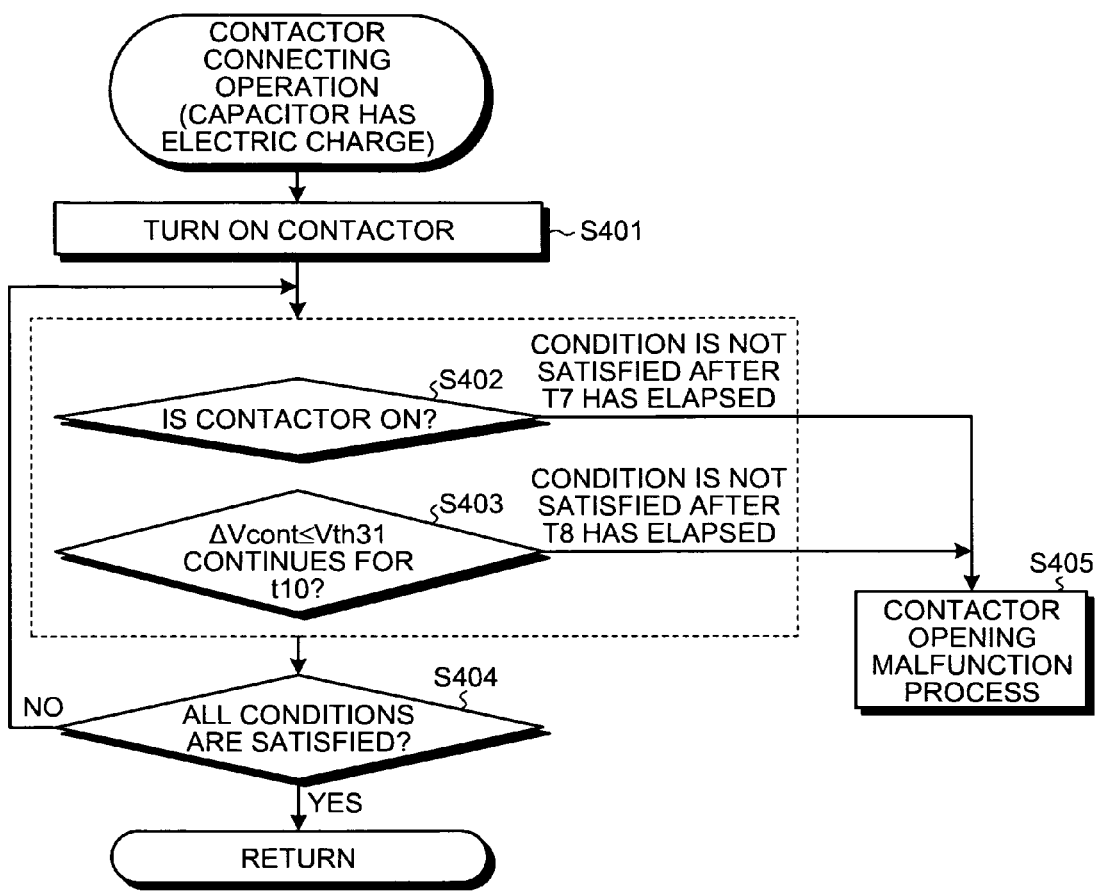
FIG. 8 is a flowchart illustrating the contactor connecting operation where the power source capacitor has an electric charge.

Next, a contactor connecting process (step S4) where the capacitor 5 has an electric charge will be described with reference to a flowchart shown in FIG. 8. In this case, the absolute value |Vcap−V1| of the difference between the voltage Vcap of the capacitor 5 and the primary side voltage V1 of the voltage converter 8 stably remains at the predetermined threshold value Vth 14 or below as the result of the SR condenser preliminary charging process (Step S1). Therefore, the generator driving device 1 connects the contactor 9 under control exerted by the contactor control unit 26 (step S401). Subsequently, the generator driving device 1 determines whether the two conditions below are satisfied or not (steps S402, S403).

As the first condition, using a specific detecting means, the generator driving device 1 ascertains whether the contactor 9 is on or not (step S402). If the contactor 9 is not turned on even when a predetermined time T7 has elapsed since the generator driving device 1 started the determination (step S305, the condition is not satisfied even after the elapse of T7), the generator driving device 1 performs a contactor opening malfunction process (step S405). The time out T7 here equals T4 described above.

As the second condition, the generator driving device 1 compares the potential difference ΔVcont between both ends of the contactor 9 with a predetermined threshold value Vth31, and determines whether the ΔVcont satisfies an inequality ΔVcont≦Vth31 and whether the condition satisfying this inequality continues for a predetermined time t10 or not (step S403). In this case, taking voltage detection accuracy into account, the threshold value Vth31 is set to a value at which clearly distinguishable voltages can be obtained. The threshold value Vth31 equals Vth23. If ΔVcont does not satisfy the condition "ΔVcont≦Vth31 continues for t10" even when a predetermined time T8 has elapsed since the dymano driving device 1 started the determination (step S403, the condition is not satisfied even after the elapse of T8), the generator driving device 1 performs the contactor opening malfunction process (step S405). The time out T8 equals T7.

If the first and second conditions described above are all satisfied (step S404, Yes), the generator driving device 1 terminates the series of contactor connecting operations. On the other hand, if the first or second condition is not satisfied (step S404, No), the generator driving device 1 remains in a stand-by mode until the condition is satisfied.

The process following the contactor connecting operation in step S4 (the capacitor has an electric charge) depends upon the voltage Vcap of the capacitor 5. If the voltage Vcap is smaller than the predetermined threshold value Vth02 (step S5, Yes), the flow proceeds to step S6, which is described below. If the voltage Vcap is equal to or higher than the threshold value Vth02 (step S5, No), the flow proceeds to step S7, which is also described below. The threshold value Vth02 here is a voltage at which the generator driving device 1 is capable of a regular operation.

Control following the condenser connecting process will now be described. After the contactor connecting process (step S3) is performed (where the capacitor has no electric charge), the generator driving device 1 performs a capacitor preliminary charging operation (step S6). As the capacitor preliminary charging operation, a conventionally known method can be used (see, for example, Patent Document 1 described above). If the voltage Vcap also satisfies the inequality Vcap<Vth02 (step S5, Yes) after the contactor connecting process is performed (step S4) where the capacitor has an electric charge, the capacitor preliminary charging operation is performed (step S6).

After the capacitor preliminary charging operation, the generator driving device 1 performs a voltage control stabilizing operation (step S7). The voltage control stabilizing operation corresponds to a stand-by mode required for the voltage control operation of the voltage converter 8 to stabilize in relation to the secondary side voltage command value V0 target assigned for a constant state operation when transition takes place from the preliminary charging operation of the capacitor 5 to the constant state operation of the voltage converter 8.

If the voltage Vcap does not satisfy the inequality Vcap<Vth02 (step S5, No) after the contactor connecting process (step S4) is performed where the capacitor has a charge, the generator driving device 1 is capable of regular operation and, accordingly, proceeds to the voltage control stabilizing operation without the capacitor preliminary charging operation (step S7).

After the voltage control stabilizing operation, the generator driving device 1 proceeds to the constant state operation of the voltage converter 8 (step S8). At this time, under control performed by the voltage converter control unit 25, the phase difference between the lower inverter 82 and the upper inverter 83 is controlled in the voltage converter 8. Specifically, the switching operations of the lower inverter 82 and the switching operation of the upper inverter 83 are performed so that a timing difference corresponding to a predetermined phase difference is made between them, thereby forming the patterns of currents flowing in the coils 84*a* and 84*b*. Such a phase difference control makes it possible to easily control the voltage pattern and current pattern of the coil 84*a* and those of the coil 84*b* at a high speed (as for the details of control for the constant state operation using the AC-coupled bi-directional DC-DC converter, see, for example, International Publication WO07/060,998).

According to the embodiment of the present invention, described above, the voltage of the surge absorbing condenser is controlled so that the voltage difference between the power source capacitor and surge absorbing condenser falls in a predetermined range. This is achieved in the following manner: of the two voltage source inverters of the AC-coupled bi-directional DC-DC converter composing a voltage converter as a boosting means, only the one that is not connected in parallel with the power source capacitor is activated to perform a chopping operation while the generator is operated with the contactor off. This enables stable voltage control even where the voltage of the surge absorbing condenser is low. Accordingly, turning on the contactor after the control process described above makes it possible to securely prevent, even where a boosting means is provided, a rush current from arising during the turning on of the contactor.

In the present embodiment, using a voltage generated by the SR motor when the engine starts, the SR condenser can be charged. Accordingly, unlike conventional technology, this eliminates the need to provide a sub-contactor or resistor for charging the SR condenser by use of an accumulator battery when the engine starts. Therefore, the generator driving device and hence hybrid vehicle itself can be made smaller in size.

Additionally, the present embodiment enables stable control even with the use of the SR motor. This makes it possible to provide a hybrid vehicle that has high efficiency and high output compared to other types of motor of the same size (e.g., a PM motor).

Having described in detail the best modes for carrying out the present invention, it is to be understood that the invention is not limited to the embodiment described above. For example, in the flowchart shown in FIG. 4, when the process proceeds to a contactor connection (step S3) where the capacitor has no electric charge from the SR condenser preliminary charging operation (step S1) performed as the result of the comparison process in step S2, the SR motor voltage control and the upper inverter operation need not be terminated. Instead, these processes may be continued.

Additionally, the present invention may use, as a generator, other types of electric motor, such as a PM motor.

In lieu of a hydraulic shovel, other construction machines may incorporate the present invention as a matter of course. Also, as well as construction machine, various types of hybrid vehicles may also use the present invention.

The present invention includes various embodiments and the like undisclosed in this description and various changes in design and the like may be made without departing from the technical concept specified in the accompanying claims.

INDUSTRIAL APPLICABILITY

As described above, the present invention is useful for hybrid vehicles that use, as a drive source, an engine and motor whose drive shafts are connected to each other. In particular, the present invention is suitable for hybrid construction machine such as a hydraulic shovel.

The invention claimed is:

1. A generator driving device comprising:
a generator;
an engine whose drive shaft is connected to a drive shaft of the generator;
a power source capacitor that supplies power to the generator and also stores power generated by the generator;
a generator inverter connected to the generator;
an AC-coupled bi-directional DC - DC converter that includes two voltage source inverters whose DC terminals are connected to an additive polarity in series, and a transformer that AC-couples AC terminals of the two voltage source inverters and has a specific leak inductance, one of the two voltage source inverters being connected in parallel with the power source capacitor and supplying the inverter with a DC voltage generated by boosting a capacitor voltage of the power source capacitor;
a surge absorbing condenser that is connected in parallel with the power source capacitor, has capacitance smaller than that of the power source capacitor, and at least absorbs surge;
a contactor connected in series between the power source capacitor and the surge absorbing condenser; and
a control unit for performing control such that the contactor is turned on after only the voltage source inverter that is not connected in parallel with the power source capacitor is activated to perform a chopping operation while the generator is operated with the contactor off, in order to control a voltage of the surge absorbing condenser so that a voltage difference between the power source capacitor and the surge absorbing condenser falls within a predetermined range.

2. The generator driving device according to claim 1, wherein the control unit has a surge absorbing small-capacitance condenser that is connected in parallel with the voltage source inverter that is not connected in parallel with the power source capacitor and connected in series with the surge absorbing condenser, has capacitance smaller than that of the surge absorbing condenser, and at least absorbs surge.

3. The generator driving device according to claim 1, wherein the generator is an SR motor,
the generator driving device further includes:
an excitation power source that is connected to the SR motor via the generator inverter and excites the SR motor; and
an SR motor condenser that is connected to the generator inverter and the AC-coupled bi-directional DC - DC converter, and charges generation voltage of the SR motor, and
the control unit turns on the excitation power source if voltage of the SR motor condenser has not reached a predetermined value for a voltage that enables stable control of the generation voltage of the SR motor.

4. The generator driving device according to claim 1, wherein
each of the voltage source inverters has a plurality of switching elements, and
the control unit performs control such that, of the plurality of switching elements of the voltage source inverter, two pairs of switching elements connected in series via the transformer are alternately switched on when only the voltage source inverter that is not connected in parallel with the power source capacitor is activated to perform the chopping operation.

5. A hybrid vehicle comprising the generator driving device according to claim 1, wherein the hybrid vehicle uses the generator and the engine, as a drive source.

6. A control method for a generator driving device which includes: a generator; an engine whose drive shaft is connected to a drive shaft of the generator; a power source capacitor that supplies power to the generator and also stores power generated by the generator; a generator inverter connected to the generator; an AC-coupled bi-directional DC - DC converter that includes two voltage source inverters whose DC terminals are connected to an additive polarity in series, and a transformer that AC-couples AC terminals of the two voltage source inverters and has a specific leak inductance, one of the two voltage source inverters being connected in parallel with the power source capacitor and supplying the inverter with a DC voltage generated by boosting a capacitor voltage of the power source capacitor; a surge absorbing condenser that is connected in parallel with the power source capacitor, has capacitance smaller than that of the power source capacitor, and at least absorbs surge; and a contactor connected in series between the power source capacitor and the surge absorbing condenser, the control method comprising:

turning on the contactor after only the voltage source inverter that is not connected in parallel with the power source capacitor is activated to perform a chopping operation while the generator is operated with the contactor off, in order to control a voltage of the surge absorbing condenser so that a voltage difference between the power source capacitor and the surge absorbing condenser falls within a predetermined range.

* * * * *